US008296325B2

(12) United States Patent
Gonzalez

(10) Patent No.: US 8,296,325 B2
(45) Date of Patent: Oct. 23, 2012

(54) METHOD FOR DIGITALLY LABELLING WEBSITES

(76) Inventor: Emmanuel C. Gonzalez, Macati (PH)

( * ) Notice: Subject to any disclaimer, the term of this patent is extended or adjusted under 35 U.S.C. 154(b) by 0 days.

(21) Appl. No.: 12/965,737

(22) Filed: Dec. 10, 2010

(65) Prior Publication Data
US 2011/0082852 A1    Apr. 7, 2011

Related U.S. Application Data

(60) Division of application No. 12/624,350, filed on Nov. 23, 2009, now Pat. No. 7,873,665, which is a continuation-in-part of application No. 09/791,440, filed on Feb. 22, 2001, now Pat. No. 7,647,339.

(60) Provisional application No. 60/238,303, filed on Oct. 4, 2000.

(51) Int. Cl.
G06F 17/00    (2006.01)

(52) U.S. Cl. ......... 707/791; 707/802; 707/822; 707/828

(58) Field of Classification Search .......... 707/600–899
See application file for complete search history.

(56) References Cited

U.S. PATENT DOCUMENTS

| 5,940,834 A * | 8/1999 | Pinard et al. ..................... 1/1 |
| 7,353,199 B1 * | 4/2008 | DiStefano, III ................ 705/37 |
| 2002/0035611 A1 * | 3/2002 | Dooley ....................... 709/218 |

* cited by examiner

Primary Examiner — Isaac M Woo
(74) Attorney, Agent, or Firm — Fernandez & Associates, LLP

(57) ABSTRACT

A host website, method and system for digitally labelling websites or subscribers with digital labels which represent characteristics or qualities of the website is disclosed. Digital labels are stored on host websites, each of which is directed to a specific subject or activity. The host website can also provide digital labels for storage in other host websites. The host website is provided with artificial intelligence capabilities. Methods and systems for asymmetric access in a host website database are disclosed.

7 Claims, 16 Drawing Sheets

Opening page when a Site Visitor Clicks "List Yourself"

This website accepts listings from people and establishments of any nationality and any place of residence, so long as the listing has some relation to the Philippines.
For more information, please see
QUESTIONS & ANSWERS If you are ready to list, please choose what kind of listing you are placing:

PERSONAL
Individuals whose primary interest is not commercial. Creating a Personal listing will also allow you to sign up to receive notices on subjects of interest to you (e.g., sales, new restaurants, concerts) and ONLY those subjects.

GENERAL
For example, companies, stores, professional persons, organizations of all kinds

AMEND/DELETE A LISTING

FIG. 4a

First Page If a Site Visitor Clicks "General"

Please enter your Name:

Organization/Company/Partnership/Trade Name:

OR

Family Name:  First Name:  Middle Name:

(required)  (optional)

Please enter your E-Mail address. The E-Mail address is compulsory and your listing cannot be accepted without one:

E-Mail:

*Next*

FIG. 4b

Basic Data Entry Page for "General"

OTHER INFORMATION:

Street Address:

City:  Zip Code:

Phone Number(s):

Fax Number(s):

Webpage Address (URL):

*Next*

FIG. 4c

Main Category Selection for "General"

| Choose a Category which best describes you or your Organization: |
|---|
| ○ Corporate: Manufacturer, corporation, financial company, media company, wholesaler or distributor - or if none of the other entries seems to fit. *    BU |
| ◉ Churches & Religious Organizations.    CR |
| ○ Civic: Culture and Museums, Environmental, and Charitable Organizations and Associations    CV |
| ○ Consumer Services: Repairs, tailoring, cleaning, gym, pawnshop, etc *    SV |
| ○ Entertainment: Persons and venues, performances, nightclubs, etc.*    EN |
| ○ Formal Education: Pre-School to University and Vocational; for other kinds of instruction, please list under "Consumer Services". ED |
| ○ Government Agencies: Offices, Departments, Local Governments and other Instrumentalities.    SV |
| ○ **Hotels ***    HT |
| ○ Medical: Doctors, Healers, Clinics, and Hospitals *    MD |
| ○ **Private and Social Clubs ***    CL |
| ○ Professional: Law, Accounting, Art, Software and EDP Services, Advertising and PR, and Design/Construction (Architecture, Engineering, Contracting) Services. *    PL |
| ○ Restaurants and Food Service. *    RA |
| ○ Retail Sales. *    SA |

FIG. 4d

Sub-category Selection

Please select the entry which best describes the entity you are listing. If this is not the kind of listing you intended, please press here.

| ○ Organized Religion |
|---|
| ○ Religious Order |
| ◉ Specific Place of Worship |

FIG. 4e

Example of a Selection Set Defining Religious Denomination,

Please indicate your religion or religious affiliation:

| ○ Anglican | ○ Methodist |
|---|---|
| ○ Animist | ○ Mormon |
| ○ Baptist | ○ Muslim |
| ○ Buddhist | ○ Presbyterian |
| ○ Greek Orthodox | ◉ Roman Catholic |
| ○ Episcopal | ○ Taoist |
| ○ Iglesia Ni Cristo | ○ Jewish |
|  | Others (please specify) <br> *Next* |

FIG. 4f

Example of a Selection Set Defining an Unambiguous Datum Which is to be Digitally Encoded (appears only for subscribers who selected "Churches & Religious Organizations" as their Main Category and further defined themselves as (1) Roman Catholic and (2) a Specific Place of Worship)

| Please check if this is a: |
|---|
| ◉ Cathedral |
| ○ Basilica |
| ○ Church |
| ○ Chapel |

FIG. 4g

Example of an Enumerative Selection Set for Services

| Please indicate if you offer or run any of the following: | |
|---|---|
| ☐ Retreats | ☐ Talmudic Studies |
| ☐ Schools, Colleges, Universities | ☐ Seminary |
| ☐ Vocational School | ☐ Novitiate |
| ☐ Bible Studies | ☐ Monastery |
| ☐ Koran Studies | ☐ Convent |

*Next*

FIG. 4h

Example of Selection Set Defining Location.

| Please mark which entry best describes your location: | |
|---|---|
| *Luzon* | *Visayas* |
| ◉ MM - Makati/Pasay/Pque | ○ Metro Cebu |
| ○ MM - Ortigas/Mandaluyong | ○ Bacolod City |
| ○ MM - Malate/Roxas | ○ Dumaguete City |
| ○ MM - Quezon City | ○ Iloilo City |
| ○ MM - Downtown | ○ Western Visayas |
| ○ Metro Manila - South | ○ Eastern Visayas |
| ○ Baguio City | *Mindanao* |
| ○ Bicol & Masbate | ○ Cagayan-Iligan |
| ○ Northern Luzon | ○ Davao City |
| ○ Central Luzon and Mountain Province | ○ Cotabato City |
| ○ Southern Tagalog | ○ Southern Mindanao |
| ○ Palawan | ○ Western Mindanao |
|  | ○ Northern Mindanao-Bukidnon |

FIG. 4i

Example of a Page Eliciting a Text Entry by Subscriber.

*Characters typed:*

Next

FIG. 4j

Summary Page Recapitulating Data Entered by Subscriber

Organization Name:

E-Mail Address:

I wish to receive information related to my field.   Yes ☑   No ☐

Street Address

City/Town:

ZIP Code:

Description

Characters typed:

You have given the following answers in sequence. Click on any answer to re-start the listing process from that point onward.

- ☐ Main Category: Churches and Religious Organizations
- ☐ Sub-Category: Specific Place of Worship
- ☐ Religious Denomination: Roman Catholic
- ☐ Cathedral
- ☐ Location: MM - Makati/Pasay/Pque

*Submit Listing*

FIG. 4k

METHOD FOR DIGITALLY LABELLING WEBSITES

PRIORITY

This application is a Divisional of application Ser. No. 12/624,350, filed Nov. 23, 2009, which is a Continuation in Part of application Ser. No. 09/791,440 filed Feb. 22, 2001, which claims priority to Provisional application Ser. No. 60/238,303 filed Oct. 4, 2000.

FIELD OF THE INVENTION

The present invention relates to data-gathering and digital labelling methods for websites, and the structure and operating processes of a specialized Host Website whose function is to maintain a library of website digital labels and to use these labels to assist in Internet searches. Embodiments of the invention also relate to the use of low-level artificial intelligence in executing Internet searches; and to a specialized "ergonomic" webpage graphic structure which further facilitates Internet searches by presenting a more intuitive interface to users.

BACKGROUND OF THE INVENTION

The original concept behind what has become today's Internet was to serve as a robust multi-path method of communication among persons who already knew each other and what they were talking about.

Due to the Internet's dramatic evolution into an open system for large numbers of participants with different purposes, key aspects of Internet mechanics are poorly suited to the functions they are being called upon to play. The small number of original users did not warrant hierarchical agglomerations of addresses on the Internet analogous to library main sections which agglomerate books of similar subject or nature. Suffixes such as .com and .net are used by so many different entities as to be meaningless as agglomerations. Moreover, there are no publicly-available mechanical means for finding or visiting sites preferentially according to their suffixes. Without manual inspection, a website for a restaurant is indistinguishable from that of a day school, or a mining company.

As a consequence of these deficiencies, the Internet poses serious problems for both "publishers"—those who operate websites in order to present information to the electronic world at large, and "surfers"—those looking for information without a known website address in mind. For publishers, the issue is how to get one's website noticed in an increasingly crowded field; for surfers, the issue is how to find what's out there.

Search engines have provided a partial solution, but not a definitive one, and unfortunately one which has led much of the Internet community down the wrong path. On behalf of surfers, a search engine starts with a surfer-inputted word or phrase, and "reads" vast numbers of sites, looking for word or phrase matches or exclusions (for simplicity, "word matches"). However, word matches only give clues as to a site's nature, not unambiguous information about a site or its publisher. As a result, searches generally yield a large number of matches, most of which do not answer the surfer's needs. Furthermore, most surfers are not willing to spend substantial time culling through the large number of matches. Later "refinements", such as frequency or prominence weighting, or counting linkage to a given site, has not significantly improved the quality of search results.

The word-match technology used by search engines is well-suited for research. News articles and academic papers which refer to specialized terms or specific names can often be searched for with great accuracy. However, as shown above, word-match technology is rather poorly suited to finding commonplace commercial information, which is, however, exactly what most publishers—the Internet's paying constituents—are trying to offer through the Web. As a result of the known difficulties of getting found on the Web, many commercial entities simply choose not to have a website at all.

Realizing their weaknesses, most popular search engines now heavily supplement their computerized searches with human research and judgment, and contractual arrangements with outside parties for the provision of data.

For example, a Yahoo search for "Denver restaurants" will yield, not a genuine search engine result, but a link to CuisineNet, a restaurant-list site. This site was clearly assembled by hand by a group of food writers covering a rather small number of restaurants for a metro area of Denver's size.

An Alta Vista search for "Los Angeles plumbers" initially yielded 100% garbage under the computer-managed websites-only search, but was salvaged with a link to what was evidently a manually constructed "Yellow Pages" section, which had a large number of plumber listings.

Hence, while touting themselves as "high-technology" enterprises with "powerful" search engines, many portals are in fact relying more and more heavily on "low-tech" human intervention. Moreover, although portals are generally supposed by the public to be impartial and non-discriminatory vehicles for finding information on the Web, it is evident that to provide apparently satisfactory search results, they must deviate more and more from this ideal.

The Internet now has tens of millions of sites, with thousands more created daily. The limitations of search engines and increasing reliance on human intervention—inherently slow, unwieldy, and prone to prejudice—therefore virtually guarantee that the overwhelming majority of sites on the Internet will not be reliably found by their intended audiences, that many will choose not to bother having a website, and that much of the Internet's potential for enabling commercial transactions will not be realized.

The focus has been on making search engines more and more intelligent, in the hope that and early automobile companies competed for the best mechanics. The focus instead should have been on making the job fundamentally easier to do. This is what Gutenberg did when he invented moveable type, and Henry Ford, when he invented the assembly line.

SUMMARY OF THE INVENTION

There is provided a Host Website system and method in which subscribers label their own products and services and in which similarly labelled objects and services are stored in common locations with hierarchical multi-parameter labels.

The system includes Internet-related data-gathering, labelling, storing and searching methods. The system and method can best be appreciated by metaphor: consider the Internet as a library whose books (websites) are not only scattered at random but also indistinguishable from each other except upon actually being opened. Internet portals are like librarians who are resigned to the fact that the books (websites) are in disarray, but purport to help readers by speed-reading. The present invention creates order in the library by establishing discrete sections where books (websites) can be organized by category, and by codifying information about each book (website) on index cards so that readers can more easily identify the books (websites) they need.

A special-purpose Host Website is established. It has a subject- or area-specific scope. It accepts subscription listings from persons or entities related to the specified scope; these persons or entities may, but need not, have a website of their own; the listings are created online, automatically, and without human intervention or review on the part of the Host Website. The listings provide contact information, descriptions, and hyperlinks to the subscribers. There would be a plurality of Host Websites covering (sometimes with overlaps) the entire conceivable population of Internet websites, whose owners would choose which or how many Host Websites on which to have themselves listed.

In the process of creating its listing online, each subscriber is asked questions by the Host Website computer, with a view to determining qualitative characteristics, such as: general nature (e.g., school); more specific nature (e.g., university); an enumeration of its activities, services, or products (e.g, medicine, law, business, etc.); its price range or an indicator thereof (e.g., state-sponsored); its headquarters and/or operating location(s) (e.g., Los Angeles, Santa Barbara, etc.); its payment and credit practices (e.g. scholarship for minorities); and similar data depending on the nature of the subscriber.

The Host Website computer poses questions automatically, takes account of previous answers, and avoids asking inapplicable questions. When the data-gathering sequence is concluded (a process of about 10 minutes), it converts the answers into a plurality of digital labels evidencing each of the identified qualitative characteristics. This can be effected with almost any programming language capable of handling instructions in the form "If A [e.g., subscriber clicked a box saying it offers scholarships for minorities], then B [instruction to computer to write an appropriate code, e.g., "mnsch", and associate it with this listing].

At any later time, any subscriber could be searched for through the Host Website on the basis of any configuration of digital labels, e.g., state-sponsored universities in California which offer minority-eligible scholarships. To perform this search, a Host Website computer would scan its database for listings which have the "mnsch" label as well as the particular labels for the other characteristics of being a school, more precisely a university, state-sponsored, in California.

Searches within a Host Website, with a defined scope, can therefore be more precise and direct than is possible under any currently-used search method on the Internet. Most important, from the viewpoint of the subscriber, the multi-parameter digital labelling and the Host Website together provide assurance that it will be found by its target audience—not the case for most websites today. For example, a hypothetical Chinese restaurant, if it had a website, would be unlikely to be found through a portal unless one knew its exact name; whereas if it were listed on a hypothetical Host Website on New York City, it would surely be found by many persons under varying circumstances and search parameters. Moreover, when found through a Host Website, a website would be in a high-relevance list and on the first few pages of hits, not the case with portal search results, in which the valid answers if any are often hidden in a sea of irrelevance.

At any time after creating its listing, a subscriber can go online again and amend its contact data or its digital labels. For example, if the restaurant has changed its phone number or has a new website address, or now charges higher prices, these can be reflected immediately online.

A Host Website computer is also endowed with artificial intelligence in the search process, by which is meant that it is programmed to understand synonyms, make suggestions to the user, and offer means of distilling search results, among others. Searchers may therefore use everyday terminology without having to wonder what magic words might be in the texts of websites they are looking for. For example, a searcher may be interested in hotels in Manhattan with king-size beds in the "moderate" price range. There is no way to elicit a meaningful response on this request from a conventional search engine. In contrast, a Host Website dedicated to New York City, when asked for "hotel", "inn", or "accommodations", could be programmed to recognize any of these words as meaning lodging, and to make the judgment (since there are many of these in New York City) that it should immediately offer a number of parameters by which to define the search, including bed-types, price range, and other qualities, so as to get a meaningful response and not a list of thousands or millions of websites which happen to have the word "hotel" in them somewhere.

All existing search technologies on the Internet are based on word-matches or "keywords", which are mere character-strings of unknown significance. Inherently, there is no way to make a word-search "intelligent". "Intelligence" involves and requires manipulation of symbols, which is precisely what digital labels are. The use of artificial intelligence in a search is only possible with a database like a Host Website's, which is based on unambiguous digital labels.

Multi-parameter digital labelling can also be extended to "Personal Preference" use, to identify websites with content that may be distasteful to some users; and "I Want Mail" labels, by which users can signify their demographic characteristics and ask to be notified of certain types of news, event, or commercial offer.

Finally, Host Websites have a specially-designed graphic interface which is "ergonomic" and considerably easier to use than most existing webpage designs.

BRIEF DESCRIPTION OF THE DRAWINGS

The invention will be more clearly understood from the following description when read in connection with the accompanying drawings in which:

FIGS. 4a-k are screens showing the user interface during operational steps in the flow charts of FIGS. 1-3b;

DETAILED DESCRIPTION OF THE INVENTION

Figure 1:
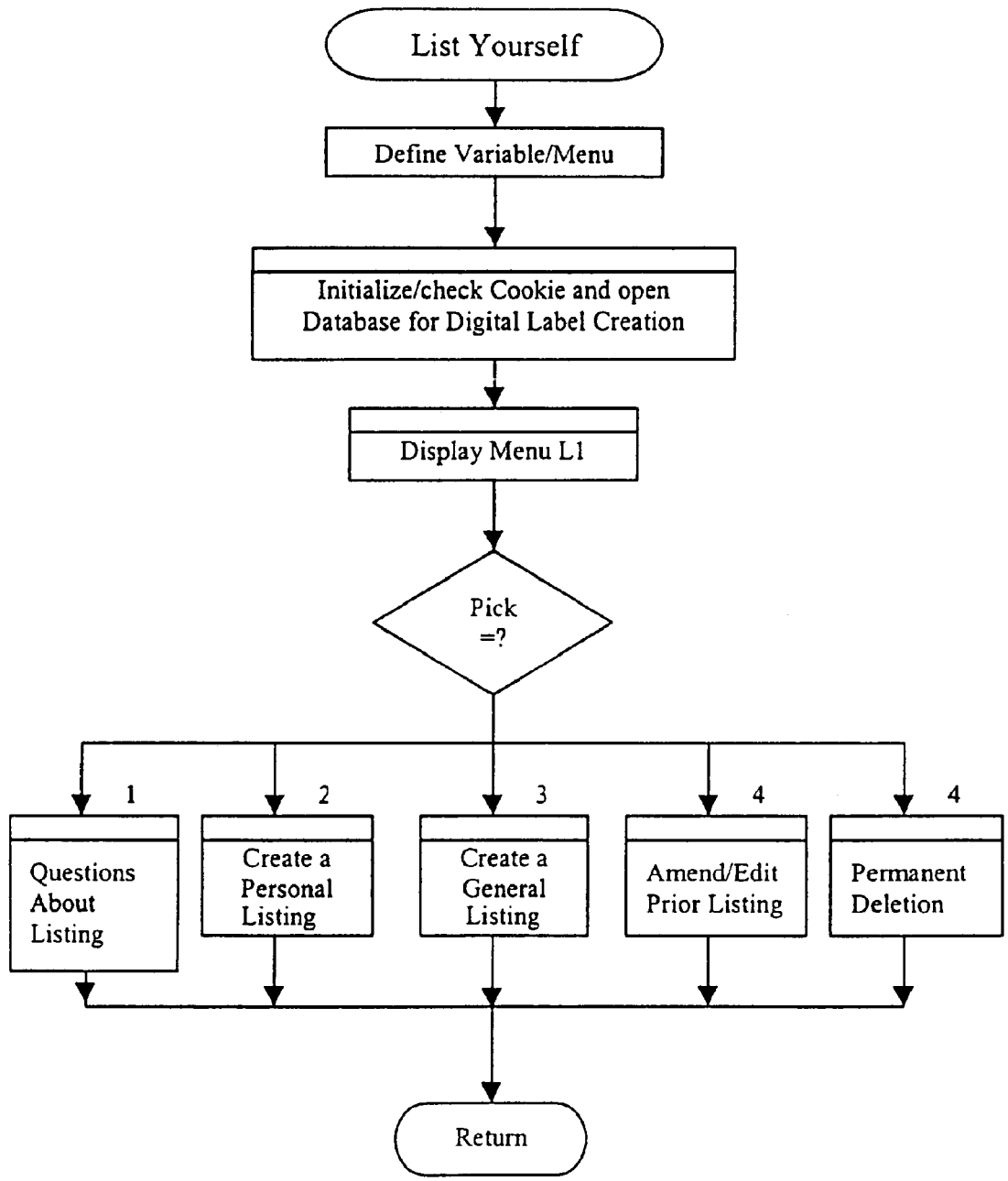
FIG. 1 is a flow chart of the operational steps for commencing a listing.

As discussed above, subscribers label their websites and the labels are digitized. A "label" is something which identifies contents, or provides information about the subscriber or his website. Generally, the labels are multi-parameter digital labels. That is, a plurality of labels, each one conveying unambiguous qualitative data about an item, its maker, or its owner, in digital form are created. This permits an item to be identified by computers according to the presence, absence, or configuration of the labels. An example of two-parameter labelling is to label a list of people. In computer field "A", place a "0" or a "1" to indicate if a person is male or female, respectively. In field "B", place a 0 to indicate a college graduate, and a blank (null entry) otherwise. Should one want to identify males who are not college graduates, the computer would search Field A for 0s, and Field B for null entries. The conjunction of the two sets would yield the desired list of males.

Multi-parameter digital labelling could help identify and sort websites according to various configurations of characteristics, with far greater precision and conciseness than search engines or systems which merely list sites under various categories. Multi-parameter digital labels could be used to indicate, for example: the nature of an entity or of its activities; location or service area; price range; specific products or services offered; credit and payment terms; exact facilities offered to customers; and many other forms of unambiguous qualitative information which could later be digitally manipulated to identify the entity under a variety of search circumstances. Information that is not even on a site could be encoded for the site. For instance, a corporation's site might not mention that it is a Fortune 500 company; but this fact could be labelled.

In accordance with one feature of the present invention, a specialized Digital-Label Website (Host Website) is established, with the principal purpose of creating and domiciling multi-parameter digital labels. Alternatively, several Host Websites could be established, one for each specified subject. Owners of websites (subscribers) would be free to select which of these, or how many of these, to be digitally labelled on. The advantage of this approach is that in each distinct such Host Website there could be a common context for publishers and users, and each subject's idiosyncrasies could be taken into account. This would simplify both the process of creating labels and of searching. These concepts are discussed more fully under Host Websites. Website publishers would go online to a Host Website and answer a series of questions designed to gather the information needed to create the digital labels. To facilitate this process, the questioning procedure would preferably feature low-level artificial intelligence, adapting the questions according to the previous answers given. An example of this is that restaurants would be asked what price range they are in, but this question would not be posed to a civic organization. Upon completion of the question sequence, the Host Website computer would request verification, create an identifier code for the website being labelled, ask for a password from the user, and then complete the process by automatically recording all the appropriate digital labels in its database. With the passwords, entities could later amend their labels online.

The automatic process of creating digital labels is not dependent on any particular hardware or form of software. Virtually any computer programming language can be employed to achieve the same net results, which are:

1. As a subscriber clicks on a multiple-choice or Yes/No answer to a question, write into a temporary file a digital label (or alphanumeric label which can be digitally processed) which uniquely refers to the substantive data expressed by the answer.

2. Accumulate the digital labels for all answers until the online subscription process is completed and the subscriber requests listing.

3. Once listing is requested, the accumulated digital labels are automatically transposed into permanent files on the Host Website. This can be done, for example, by maintaining database columns for each possible kind of digital label, and under each column placing the identifier numbers for all listings to which this label applies. For example, there might be a digital code "usnyuw", meaning a location in the Upper West Side of Manhattan. Under the "usnyuw" column would be the ID numbers of all the subscribers located in this part of Manhattan. When a listing is created, the computer would read the labels noted in the temporary file, find the columns for each label, and write this subscriber's ID number under each applicable column. There are several alternate methods of structuring a digital-label database with essentially identical effect except for computer processing times.

Users are able to search the Host Website's database by specifying types of qualitative data found on the digital labels. This would allow high-precision results. Search methods are more fully described below.

Most website publishers, especially commercial entities, would wish to have their sites digitally labelled, in order to improve their chances of getting found on the Web by interested searchers. Indeed, with very few exceptions, getting found is the primary worry of Website publishers. Provision could also be made for entities without websites to register basic information about themselves and be digitally labelled; this would be useful while their websites are still under construction. Also, entities with modest means or scope could view a registration and labelling on the Host Website as an affordable alternative to having their own website, and an easy way to become a participant in the Internet.

The multi-parameter digital labels thus far described are "pure" digital labels. For example, in the process of listing on the Host Website, an entity may indicate that it is a wine merchant, where "wine merchant" is a predefined term within the listing process, and this phrase is therefore "understood" by both the subscriber and the website computer.

In some circumstances, the use of "hybrid" digital labels may be expedient, especially where the multiplicity of possible responses makes it impractical or impossible for the Digital Labelling Website to be exhaustively pre-coded for every contingency. A hybrid digital label is one in which the field is unambiguously digitally defined as a certain kind of field, but the subscriber entry in the field is a character string.

For example, a Digital Labelling Website may invite subscriber wine merchants to enumerate the wines they stock, these enumerations to be recorded in a database field which it predefines as "wine merchant stock list." The subscriber may then enter text (character strings), e.g., "Chateau Latour 1961." This entry, despite being a character string, now has a known and unambiguous significance, which is that it represents a wine of some sort offered by a wine merchant. With an appropriate interface, a site visitor could type out a particular wine name, in response to which the Host Website computer would perform a word-match search which is limited to this certain database field ("wine merchant stock list"). Instead of tediously searching the entire Internet for all mentions of "Chateau," "Latour" and "1961"—which is what all conventional search engines would do, thereby yielding millions of irrelevant hits, with the aid of the hybrid digital label, a Host Website computer (which is programmed for the purpose) could quickly and precisely identify all the wine merchants on the Web which stock Chateau Latour of any vintage, and whether any stores at all have its 1961 vintage.

Using ordinary word-matching technology, an attempt to find bottles of Latour 1961 for sale on the Web would meet with little success; if the phrase were even interpreted correctly as a certain vintage of a certain wine estate, the search engine would most likely turn up an article on rare wines and not a list of ready and willing wine sellers.

Hybrid digital labels are therefore comparable in utility to "pure" digital labels in certain applications, especially in dealing with potentially long enumerations of products, brands, persons and similar kinds of items.

Multi-parameter digital labelling of sites could be performed manually. Illustratively, one would scour the Internet to identify sites that referred to wine makers. By interviewing the owners, reading wine books, and whatever other method, one could determine the location of each wine-maker; what kinds of wine it makes; what price range the wines are; and so forth. All these pieces of information could be codified as sets of multi-parameter digital labels for each site, and serve to convey unambiguous qualitative information about the site and its owner (the winery).

To further improve on the process of digital labelling, as much as possible of the process should be automated, by which is meant the use of any computer-based process which facilitates the work of a human data-gatherer or encoder. Finally, websites can be labelled automatically, i.e., without any human data-gatherer or encoder at all, by programming a computer to undertake the entire process of gathering data and creating digital codes. One such process will be presently described.

When the multi-parameter digital labelling of a website exists within or at least in the same computer as, the website itself, it could be termed "resident" multi-parameter digital labelling. At this time, resident labelling is impractical on an Internet-wide basis because this would require accessing all the sites on the Web every time anyone conducts a search. In contrast, "Non-resident multi-parameter digital labelling" refers to the maintenance, in a single location different from that of the website, of multi-parameter digital labels for that and other sites, within an overall construct for systematic multi-parameter digital labelling as defined above.

All existing Internet search methods are based on word matches or listings-by-category.

Multi-parameter digital labelling creates a foundation for a new approach to Internet searches, one using artificial intelligence. It should be clarified that the term "artificial intelligence" as used herein refers to "low-level" artificial intelligence with moderate reactive, adaptive, and semantic capabilities, as opposed to "strong" artificial intelligence with highly complex behavioural and comprehension features. Nonetheless, even low-level artificial intelligence is qualitatively different from, and a significant improvement over, the non-adaptive, inflexible-response capabilities of searches by word match or category listings.

Human intelligence is often distinguished from animal intelligence in that it involves the ability to understand and manipulate symbols. In turn, artificial intelligence is often described as the ability of a machine to mimic human intelligence; hence, artificial intelligence must also involve, to some extent, the understanding and manipulation of symbols.

Word-matching and category-listing activities are not symbolic in structure, so no search technology based on these could ever, by both definition and practical demonstration, involve artificial intelligence. In contrast, digital labels are symbols, and a general system of multi-dimensional digital labelling can therefore provide the basis for searches using artificial intelligence.

The forms of interaction between the computer and a user are predicated by the aggregation of digital labels that are possible under the system. First, therefore, the computer must know all the labels possible within a given system. If this system were a subject-dedicated Host Website as described further below, the number of possible labels would be relatively easy to work with.

Second, the computer must be taught how different kinds of labels relate to each other. Some qualities represented by labels are mutually exclusive (e.g., church or restaurant); some are enumerative (e.g., the facilities of a hotel); some subsume others (e.g., a country location subsumes cities within the country); and so forth. The digital labels must be organized in discrete fields, with appropriate operators. A hierarchical alphabetic code with six or more levels is contemplated, in the form: XX.xx.(xxx)n.(xxxx)n.(xxxxx)n.(xxxxxx)y, where XX represents a compulsory label indicating a broad sector, e.g., Retailer, where xx represents another compulsory label indicating a specific sub-class (e.g., sporting goods store); where (xxx)n represents non-compulsory, non-bounded enumerations that relate to the products or services of the XX.xx (e.g., tennis shoes, golf balls, each of these having its own three-letter code); where (xxxx)n represents non-compulsory, non-bounded enumerations that flow from and are particular to the predecessor xx or xxx (e.g., Adidas, Maxfli); (xxxxx)n represents non-bounded enumerations relating to trade practices such as opening hours, shipping policies, etc., that are compulsory for certain XX.xx.xxxn combinations but not others; and (xxxxxx)y represents a worldwide location code in which the first two letters indicate the country. The form of the code is unimportant, so long as the fields are accurately structured to reflect substantial realities. This stage of creating the artificial intelligence is analogous to teaching basic symbolic or abstract concepts to a child, such as: an object may be round or square but not both; an apple is never purple; something purple cannot be an apple; etc.

Third, the computer must be given an extensive vocabulary and syntax which relates to the labels. This is the interface between the eventual human user and the digital labels. Creating this vocabulary and syntax are a lengthy and involved process which must be carried out manually by humans, because it is the equivalent of teaching the computer how humans think. Fortunately, in a subject-dedicated construct, the likely forms of interaction desired by users can be readily appreciated and programmed for. The following box illustrates these concepts within a hypothetical Digital-Labelling Website focused on a city: 1 User Input Programmed Computer Response DVD Find four specific xx.xxx digital labels, identifying entities which sell DVD players, repair them, rent DVD discs, or sell DVD discs. Second-round response: offer to narrow the list to one of these categories. DVD rentals; Find one specific xxx-type digital label evidencing rental DVD; shops which rent DVDs (Same response for all four DVDs for inputs; in practice, many more variations would be hire; DVDs programmed to have identical meaning.) for rent Restaurant Block off entities which have the Specific XX-type code meaning restaurant. Display on screen "Would you care to select a type of cuisine; location; price range?" Walk user through any choices made. Identify those whose labels evidenced all the requisite characteristics. AI's If AI's is known to the website, shows phone, address, Restaurant hyperlink if any. Does not list entries which use the word "restaurant". Chinese Find one specific XX.xx combination. Evaluate list; if restaurant(s) short, show on screen; if long, ask for a location parameter. Chinese Display on screen "Please indicate which of these you are looking for: restaurant; movie theatre; civic organization; government office; club. You may also ask me to perform a conventional word-match search for 'Chinese'." china Find several specific xx.xxx combinations evidencing stores which sell china, bone china, stoneware, glass tableware, porcelain tableware; display list, but at top of list, offer alternative: "If you meant the country, please click here." If clicked, would then show consulate, UN mission, etc. At bottom of list, offers option "Any specific brand of china or type of tableware in mind?" [Box for user's response.]

Artificial intelligence searches are based on concepts rather than word-matches or category listings, and the computer's response to each input is conditioned on knowledge imparted to the computer by its human programmers. In the example above, the response to "china" evidences the programmer's belief that most users (in the context of a city-oriented Host Website) who use this word by itself mean dishes, but allows an alternate possibility; whereas the response to "DVD" evidences the programmer's belief that any of the four possibilities is equally likely, thus all four are immediately offered. As shown in the example above, multi-parameter digital labelling permits second-round distillation to prune a large list down to a more manageable length.

The computer in the above example judges that persons in the city browsing for a restaurant will likely have both a type of cuisine and a neighborhood in mind, and may be concerned with price range, as well. This is best handled through a multi-parameter search from the outset, rather than forcing the user to follow a number of iterations before being able to specify all the desired parameters. In contrast, the computer judges that persons looking for chinaware will be content to see a city-wide list of vendors, but allows that a few will wish to specify a particular brand of china, and further that many people will say "china" when they mean porcelain, glass, or stoneware.

A well-designed artificial intelligence can therefore distinguish among different kinds of search concepts, "guess" the searcher's likely motives and concerns, and proceed along appropriate lines. This can greatly simplify even a complicated search. The very large difference between conventional word or category searches, and searches with artificial machine intelligence operating on a plurality of digital labels, can be illustrated by example.

Digital labels can, for example, identify a website as one belonging to (a) a drugstore; (b) in the Upper West Side of New York City; (c) that is open 24 hours. Because of the contextual knowledge of what kinds of labels may have been created for the hypothetical New York City-focused Host Website, a computer can be programmed to understand the phrase "all-night" as having the same meaning as "open 24 hours", and "pharmacy" as having the same meaning as "drugstore". Therefore, within reason, a user may use his or her own terminology to initiate a search, and still get the same results, regardless of what words might (or might not) be on the target entries or websites. "All-night pharmacy" will be unambiguously understood by a digital-label-based search to mean the same as "24-hour drugstore". Once the first set of results comes back, the computer could similarly be programmed to recognize if the number of hits is too large to be useful, and to suggest means for narrowing the search. For example, it could be programmed to suggest "Narrow the list to a particular location?", and offer a list of districts in New York City to choose from. Now, the user might select "Upper West Side", yielding a list of all the 24-hour drugstores in the Upper West Side.

A word-match-based search on a portal will yield little useful information about "all-night pharmacies", much less in the Upper West Side of Manhattan. If any such entities are turned up, they are almost sure to be lost among the several million "hits" that come back.

A search by category, on the other hand, will begin by instructing the user to select a category from (typically) several dozen possibilities, each of which has multiply-nested sub-categories. After several iterations, the user may then come to a list of drugstores, which will have to be evaluated one by one in the hope of identifying a drugstore that is both in the Upper West Side and open 24 hours. This is considerably more tedious than an artificial-intelligence guided search would be.

Present filtering software, intended to block Web material considered distasteful by some persons, is inaccurate or based on keeping blacklists which are instantly out-of-date. Moreover, many of them only address sex-related websites, and not others which some may consider even more distasteful, such as "hate" or "school for terrorists" websites. Systematic multi-parameter digital labelling would allow the accurate identification of such websites.

The systems by which Personal Preference labels could be created and used are:

1. A specialized "Personal Preference" website would be created to accept online self-labelling by sites on parameters such as sex, violence, or hate content. All sites on the Internet would be invited to have themselves labelled (or compelled to do so as a condition of having an Internet address).

2. Sites would either receive null-report labels—no potentially offensive content reported, or positive labels indicating that certain potentially offensive characteristics were reported.

3. The Personal Preference website would maintain a library of all such labels. Persons would visit the Personal Preference website to register preferences as to kinds of content they do not want shown on their computers, and leave a password. Their preferences would be encoded in a cookie (listing all the URLs which are to be avoided) deposited in the user's computer or browser files; this cookie would be so designed as to prevent the browser from accessing unwanted sites. The cookie would automatically update itself. Should the user change preferences, he or she would re-visit the specialized site, and make new selections, which would alter the cookie.

4. Personal Preference labels could also be "resident" in each website, in a widely-agreed format and location. Browsers or filters could be designed to check for such labels, according to a user's preference, before opening other parts of a site, thus also thwarting "deep links". This approach would require some alterations in Internet address-accessing protocols.

Personal Preference labels would help respect user preferences without infringing on the First-Amendment rights of publishers. On the one hand, it may be presumed that a site with no label has potentially distasteful content. On the other hand, those who do label will likely be truthful, since a deliberate mislabelling would constitute (or could easily be legislated to constitute) a fraud or felony, which presumably could be penalized with closure of the site. The use of Personal Preference labels thus allows an effective system for discriminating among websites, not on the basis of content (which would be unconstitutional), but on the basis of truth-in-labelling.

The preferred embodiment of multi-parameter digital labelling and artificial-intelligence searches is through Host Websites, a new form of website which provides listings and information on entities, people, or documents sharing a common characteristic, on an open and non-exclusionary basis, employing automatic multi-parameter digital labelling to record unambiguous qualitative information, and which offers the use of these digital labels to the public to facilitate searches. Such a Host Website is hereinafter called a Host Website.

The structural role of a Host Website is to provide a "patch" for the Internet's lack of hierarchical agglomerations of addresses. Each Host Website would represent a convenient means for Internet participants with a common characteristic to self-agglomerate through one Host Website.

The configuration and operation of the Host Website will be more clearly understood from the flow charts of FIGS. 1-3*b*, 5, 6*a* and 6*b* and the screen displays of FIGS. 4*a*-4*k*. The flow charts illustrate the creation of a multi-parameter digital label and the process for searching. This particular example is for a regional website in the Philippines.

FIG. 1 is a programming flow chart for the introductory script when a "List Yourself" button on the screen is pressed by a subscriber or user. The user is presented with a display similar to the one shown in FIG. 4a in which he is advised that the Host Website is directed to listings in relation to the Philippines. The user is then presented with several choices: Open a Questions and Answers text; Create a New Personal Listing; Create a New General Listing; Amend a Listing; and Delete a Listing. Each of these choices results in a discrete module being opened. Provision is made for a benign cookie which is extinguished once a listing is completed, and whose presence at this stage would indicate a listing-in-process that was not completed in one session, noting where the listing left off; past answers can be retrieved from a temporary file in the Host Website database, so that the subscriber does not have to re-enter the data.

Wherever possible, the List Yourself sequence employs "radio buttons," subscriber choices which, when clicked or checked, immediately proceed to the next appropriate page without the necessity of clicking a Next button. This saves time and effort (mouse movements/clicks, keystrokes) for the person entering a listing.

Figure 2A:
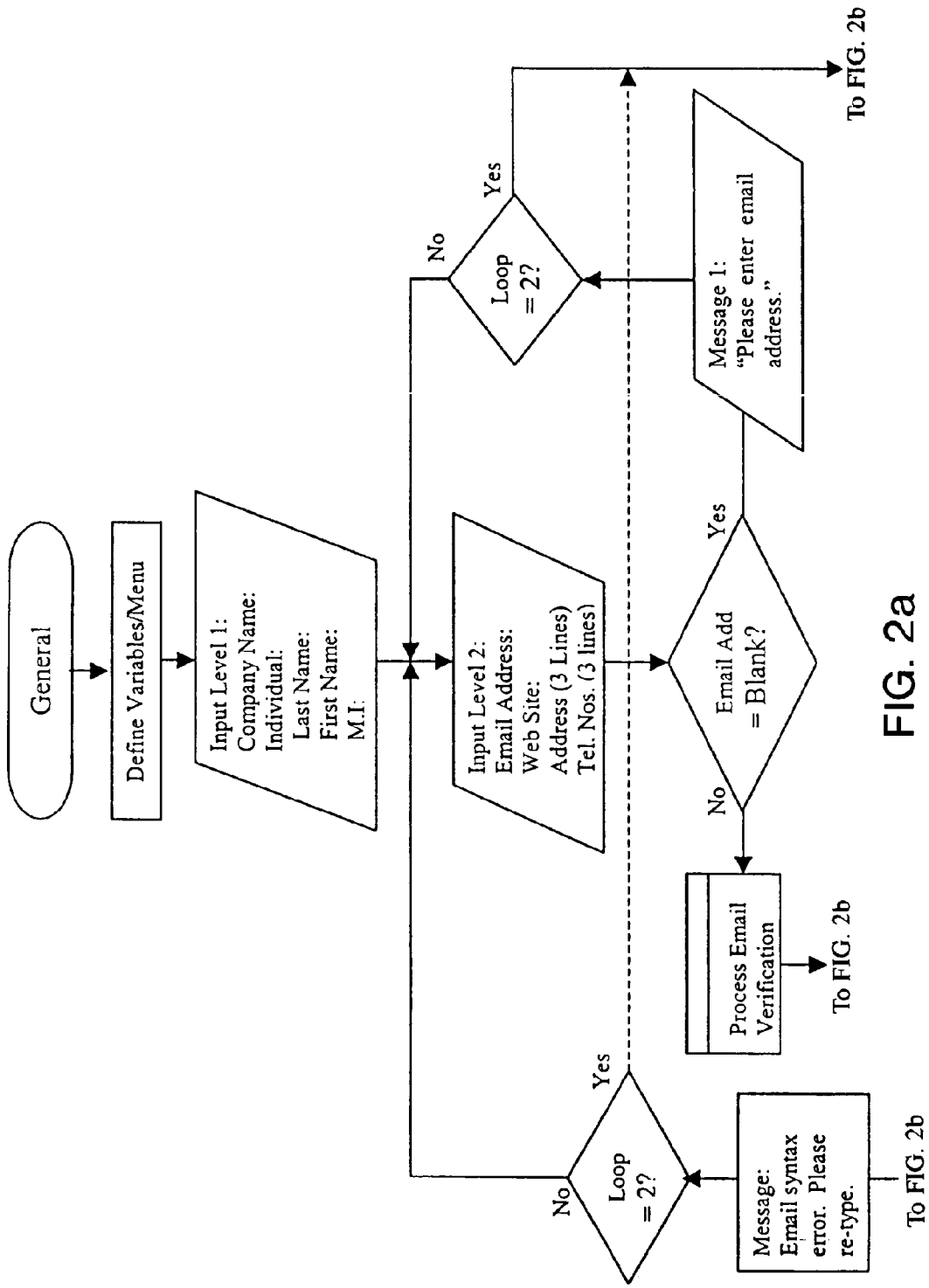
FIGS. 2a and 2b show a flow chart of the operational steps for creating a particular category of listing.
Figure 2B:
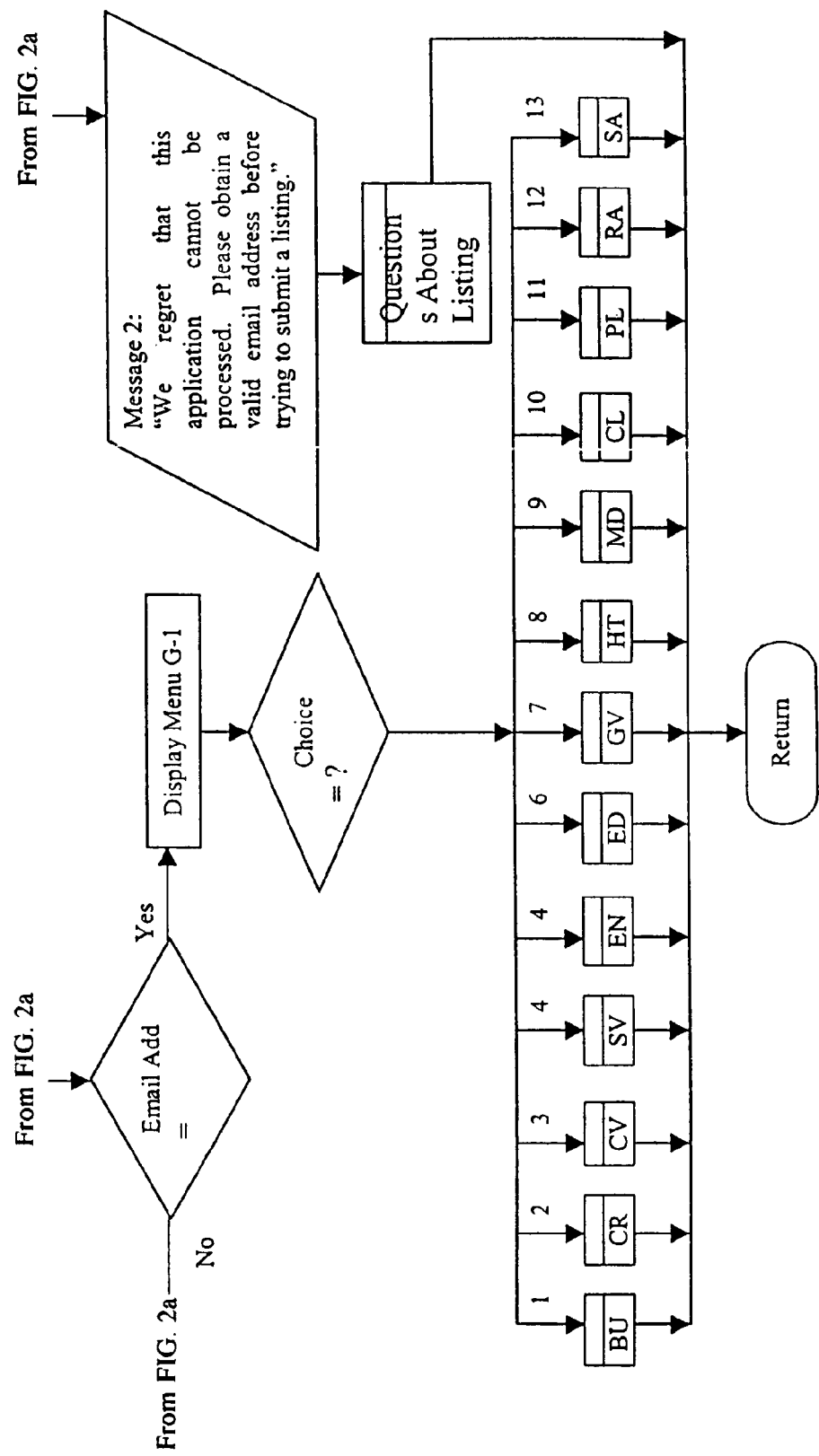

FIGS. 2a and 2b show a programming flow chart which assumes "Create a New General Listing" was selected (i.e. user clicked "General" in FIG. 4a). This flow chart defines the sequence of gathering names and general contact data from the subscriber who is advised that he need not supply all "other information" (illustrated in FIGS. 4b and 4c). This leads to a choice from among thirteen broad categories (FIG. 4d). These categories were deemed appropriate in light of the subject. A Host Website on a different subject would have a different number or definition of categories.

Though not depicted in the flow chart, the programming underlying FIG. 4b is designed to accept either an organization name or a person's name, but not both. The act of typing a character in any box causes the automatic erasure of any previous typing in the other box. Moreover, the programming also checks if an email address in the correct format has been entered; and if not, it prompts the user to enter the email address, and/or tells the user what is wrong with the address entered (e.g., no "@" symbol found, no dot-suffix found). These are examples of the use of low-level artificial intelligence to make the listing process smooth and error-free, while minimizing keystrokes for the user.

Figure 3A:
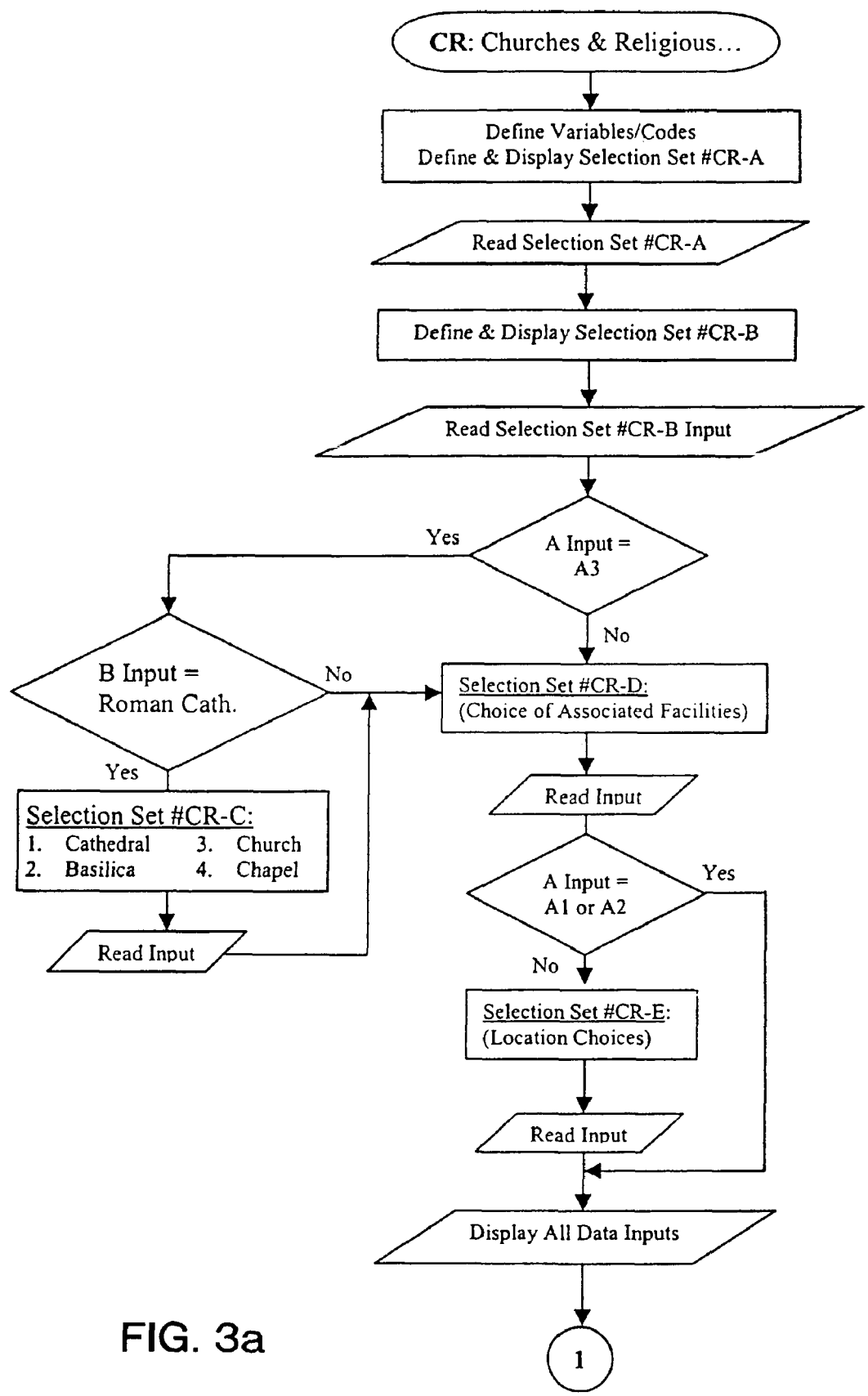
FIGS. 3a and 3b show a flow chart of the operational steps for creating a particular listing.
Figure 3B:
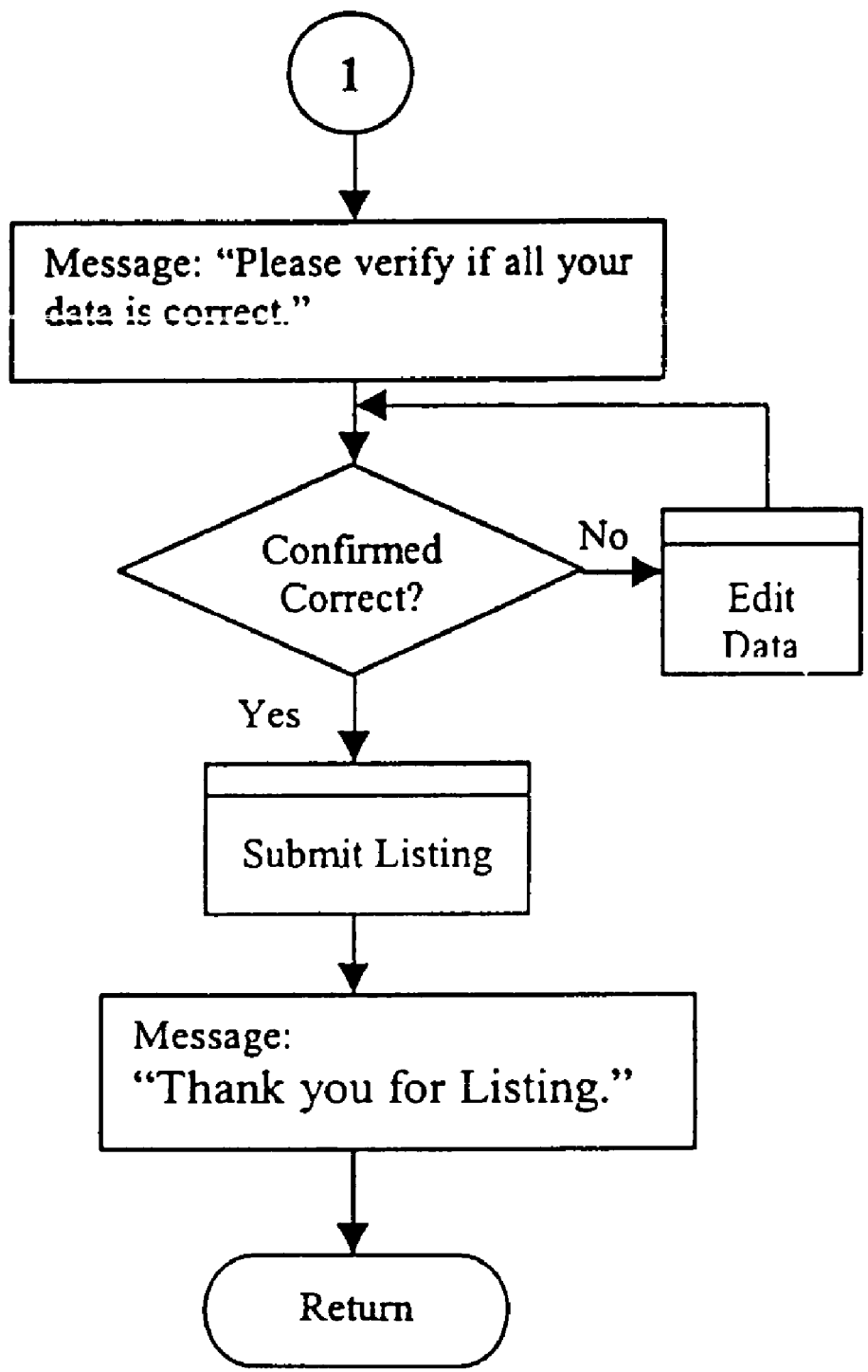

FIGS. 3a and 3b show a programming flow chart which assumes that "Churches & Religious Organizations" was selected as a main category in FIG. 4d. The visitor is now asked to specify whether it is an organized religion, a religious order or a specific place of worship that is being listed (FIG. 4e), then what the religious denomination is (FIG. 4f). With each answer given, the Host Website computer writes an appropriate alphanumeric code into a temporary file in its own database. This is a "scrapbook" file where all the digital labels created for a listing-in-process are stored.

There is a sub-routine which is presented only to those identifying themselves as both Roman Catholic and a Place of Worship, allowing the subscriber to specify whether it is a cathedral, a basilica, a regular church, or a chapel. The page that would appear to the subscriber is illustrated in FIG. 4g. This level of detail is a function of this particular country, and would not be warranted for, say, Indonesia. There is a further sub-routine which allows the specification of activities or facilities offered by the respondent; the page that would be shown to the visitor is illustrated in FIG. 4h. Finally, Places of Worship (but not Organized Religions or Religious Orders) are asked to specify a location. FIG. 4i illustrates a location-query page as it would appear to a visitor.

The location choices shown in FIG. 4i are particular to Places of Worship. These choices are programmed in anticipation of how a future site visitor might wish to search for a Place of Worship (e.g., with Metro Manila broken into several districts). A pulp-and-paper factory, for example, would be presented with different location definitions and choices that are more appropriate for its nature (e.g., Metro Manila would not even be a choice, it being a known fact that there are no such factories there, nor could there be). This is another example of how low-level artificial intelligence can be programmed into a Digital Labelling Website. The following are examples of the codes created when the user follows the routine of FIGS. 3a-3b. "CR" is written when visitors select G-2. "PW" is written when visitors select specific place of worship. "RMN" is written when visitors select roman catholic. "CATH" is written when a PW/RMN coded visitor indicates cathedral. "phmkti" is written when visitors indicate the location in Makati the central district of Metro Manila. All respondents eventually wind up by being asked to enter a text description (FIG. 4j), for example, schedule of services, special interests, etc. The subscriber can then verify all previous answers (FIG. 4k), and click a Submit Listing (bottom of 4k). Also within FIG. 4k is a box which allows the user to indicate if it is willing to receive information related to its field (which in this case is Religion). This is an example of I-Want-Mail labelling.

Figure 5:
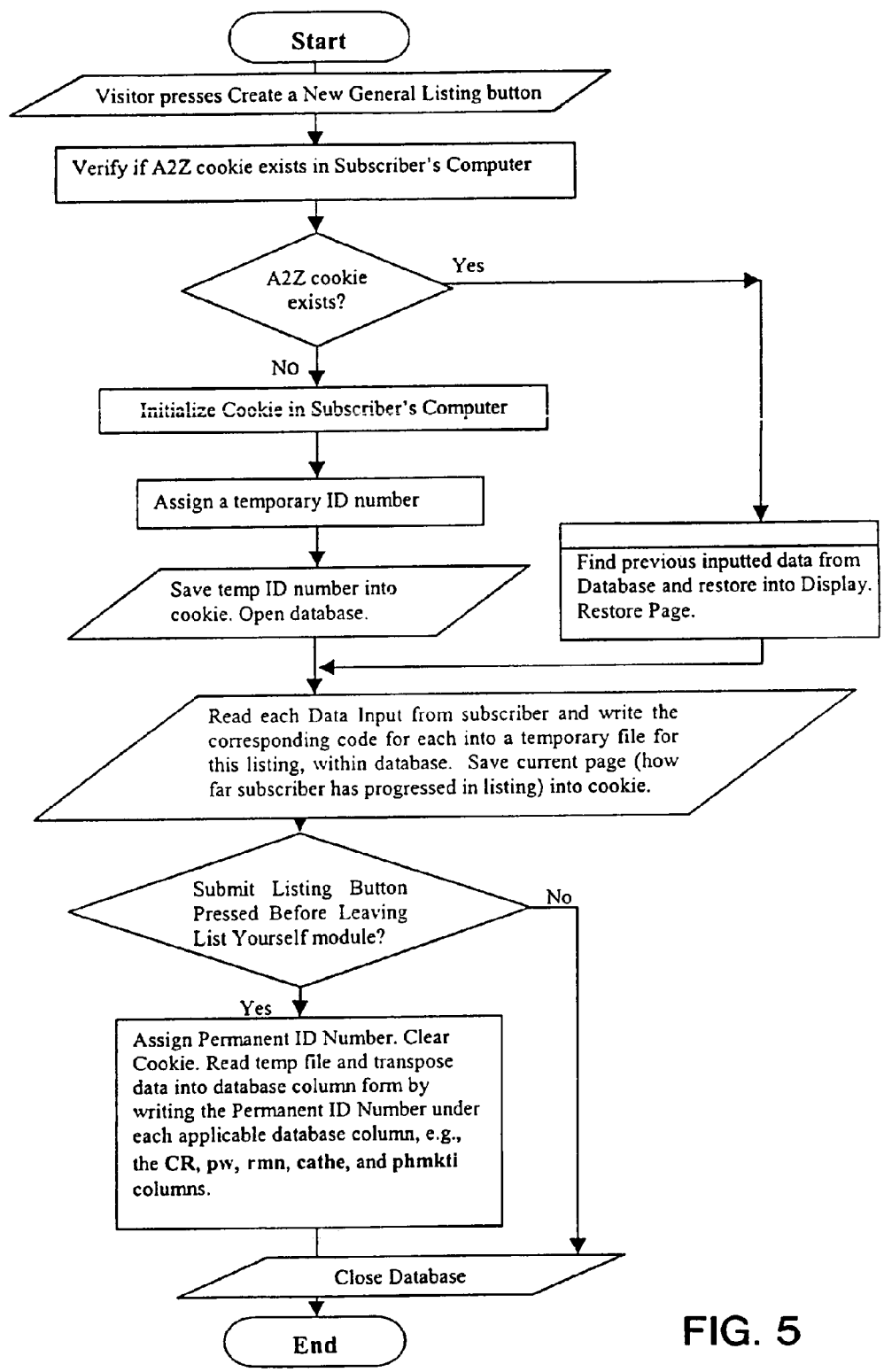
FIG. 5 is a flow chart of the operational steps for creating and storing multi-parameter digital labels in a database.

FIG. 5 illustrates how the multi-parameter digital labels are created and then permanently stored in the Host Website database. When a Submit Listing button is pressed (bottom of FIG. 4k), the computer reads its "scrapbook" file on the listing-in-process; and searches for the columns in its database which correspond to each label. Under each column, the unique ID number of the subscriber is written in. For example, there might be a column in the Host Website database for the digital label "phmkti", which means a location in Makati, the central business district of Manila. If a church, synagogue, or mosque had indicated a Makati location, its ID would be inscribed in the column titled "phmkti", along with all other listed entities (restaurants, hotels, stores, etc.) which indicated a Makati location. The same will be done for every digital label that applies to the listing.

Hybrid digital labels could be treated in essentially similar fashion. For each pre-defined hybrid field, the unique ID number of each subscriber (with entries for that field) would be written in. Appended to that ID number would be a data row of unlimited length which includes each of the text entries, individually.

Figure 6A:
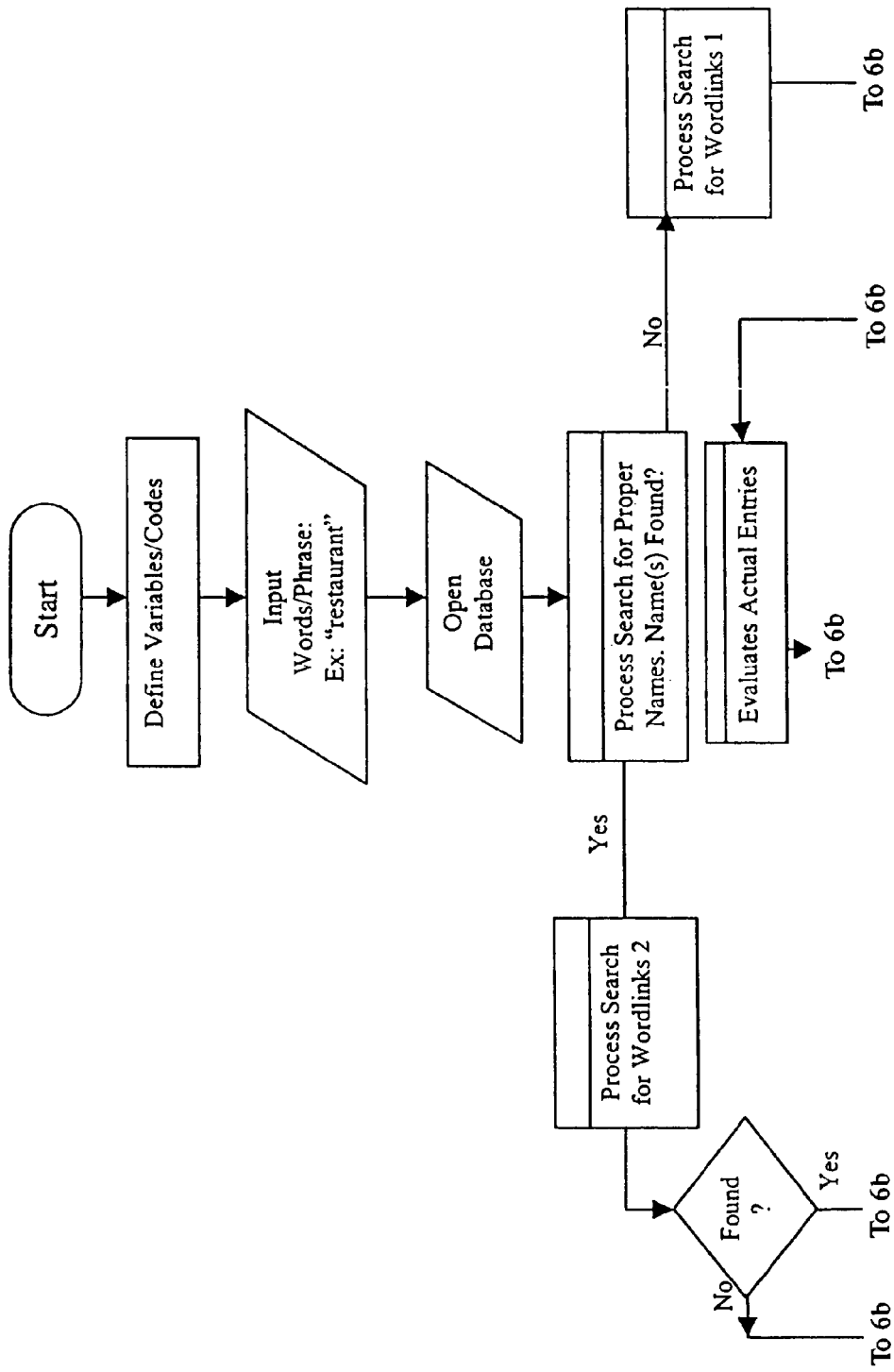
FIGS. 6a and 6b show a flow chart of the search logic.
Figure 6B:
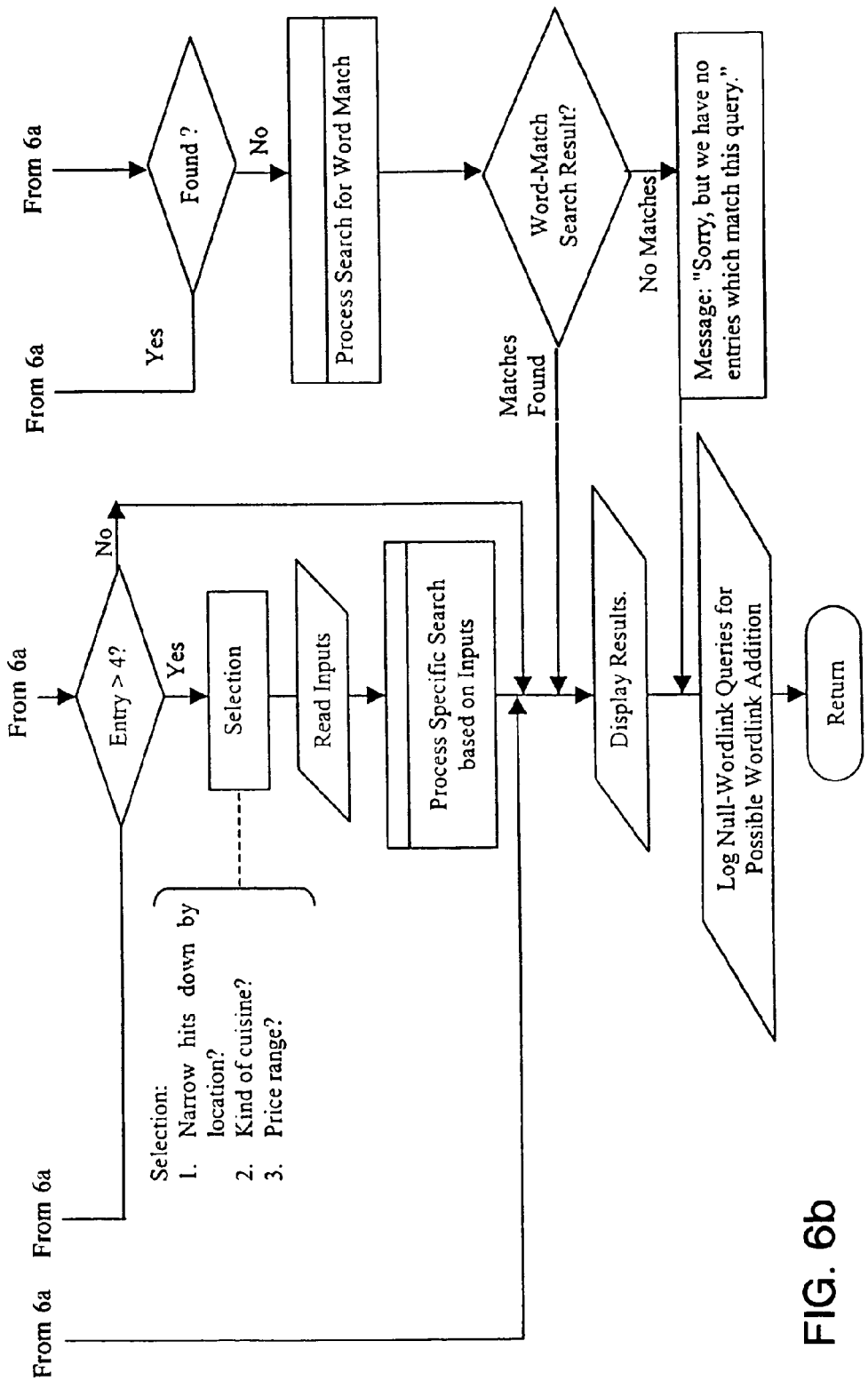

FIGS. 6a and 6b show the search logic in response to an inputted word or phrase by a surfer. First, the Host Website computer checks if there is a proper name which corresponds. In effect, a word-match search will be conducted, but limited to fields which have been defined as name-type fields. This is an example of a hybrid-digital-label search. There are several fields defined as proper names such as main listing title, enumerations of alternate names of companies (e.g., "Coke" for Coca-Cola Bottling Company), enumerations of corporate officers, and enumerations of brands carried. If a user were to enter "IBM", then IBM (Philippines), Inc., would immediately be accessed; while if a user entered "George Smith", and there were a George Smith listed as an officer of IBM, then Mr. Smith's entry would come up; and finally, if a user entered "Gucci", stores which indicated that they stock Gucci brand items would be returned as search hits. Second (in addition to the first), the computer checks if the inputted word is on its Wordlinks database—meaning it is a word or phrase that the computer "understands." It would then search its database for entries with the appropriate digital labels. "Xerox", for example, refers to a company and also to photocopying in general, so it would be on the Wordlinks database. A "Xerox" search would yield first Xerox (Philippines), Inc., then a list of other companies selling, manufacturing, or repairing photocopiers. Third, if there is a Wordlink, the computer evaluates if there are actual entries which correspond to the Wordlink, e.g., in the "Xerox" example, if there are listed entities which sell, make, or repair photocopiers. If there are none (and if there was no proper-name match), it explains that it understands what the searcher is looking for, but doesn't have any entries which match. If, for example, one were to search for "Manila resort", the computer would scan its database and find it has no resorts which are in Manila, and report this to the user. Fourth, the computer would count the number of hits turned up by a Wordlink action, and if the list is greater than 4, offer (if one is available) a way of shortening the list. For example, a search for "Manila restaurants" is likely to yield a long list; before even displaying the results, the computer would ask the user to select a type of cuisine; a more defined location in Manila, a price range, etc. The user could specify any, all, or none of the parameters offered, and the computer would then display the appropriate list.

Though not shown on the flow chart, as a matter of fairness to all listers, the order of presentation of results to generic searches would be randomized, so that AAA Plumbing is not always at the top of the list when a user enters "plumber".

Finally, if there is neither a name-match nor a word/phrase that the computer has been taught to understand, then it would carry out a conventional word-search of its entire database. For each Host Website, when this happens the particulars will be logged and manually evaluated, with a view to expanding the Wordlinks database and thus the computer's vocabulary.

By establishing an agreed context for interaction between publishers and users, Host Websites greatly facilitate the process. Unlike a portal which of necessity must try to be all things to all people, a Host Website can be graphically and mechanically structured to suit the subject matter and make it easy for users to find the information they need. A Host Website can also be programmed to understand certain words and terms as having a particular meaning in the context of its subject.

Host Websites are open markets for information, and therefore efficient, unlike portals which pose effective, if unintended, barriers to entry. The right to list on a Host Website is unequivocal and not subject to human review; listings are initiated by the subscribers, which may therefore choose which Host Website(s) to list on. This assures that each Host Website has a self-selected population—a major step toward accurate search results.

Host Website search results will be concise. Most searches by a conventional search engine will yield thousands to millions of "hits", or possible answers. Even if the correct answer is there somewhere, it is nearly useless if it is buried in a mountain of non-answers.

Host Websites, by employing unambiguous qualitative multi-parameter digital labels, also permit searches by artificial intelligence, as described above.

Host Websites permit automated multi-parameter search, not defined solely by matching words or phrases or by broad pre-determined categories (as is the case with all search engines and portals), but by qualitative characteristics such as price range, services provided or products sold, and others. An example of a multi-parameter search is one that seeks (1) a resort in a specified country, (2) with king-bedded rooms, (3) that offers both golfing and scuba-diving. This kind of search is simply beyond the scope of searches based on mere word matches or category listings.

Host Websites permit qualitative second-round (third round, etc.) distillation of search results, which permit the further narrowing-down of the original results, according to qualitative parameters that can be selected by the user. There is no existing portal or search engine which allows qualitative second-round distillation. (Some portals permit additional words to be entered after an original search; but this is not qualitative distillation. Moreover, as an empirical matter, such features will only yield a useful result if the target entities were known in the first place, in which case they could have been found directly.)

Though primarily intended for those with websites, Host Websites admit listings from those without websites, who would create an information entry on the Host Website itself.

Host Websites represent a clear solution to the number one problem facing the vast majority of website publishers (or would-be website publishers)—how to get their sites found. Publishers could simply sign up online with a Host Website that covers their activity, and be assured that they will be found through it. For example, a small business website selling cookies has little chance of getting noticed by a portal; but if it were listed on a hypothetical Host Website for Internet Vendors, this Host Website would consistently attract an appropriate audience, and the cookie-vendor's chances of getting found by people who want to buy cookies over the Web would increase greatly.

As a matter of fact, there are already websites whose subject is Internet Vendors, but because these sites are manually assembled and managed, and lack multi-parameter digital labelling, it is very difficult for them to attract enough listings or enough traffic to reach a critical mass. Persons may use such sites once or twice, and then be unable to return later because they have forgotten the web address. Thus, such "list" sites themselves join the ranks of comparatively anonymous sites which have trouble getting found.

A Host Website is so structured that creation of a listing on it can be done by a person online at any time, without other human intervention, and have immediate effect.

The subscribing entity can use its real name on its listing. In contrast, Internet-address conventions impose severe limits on how a domain name is structured, and many entities may not be able to obtain a domain name that closely resembles their real or trade names. In this sense, a Host Website is also incidentally a mechanism for translating a trade or everyday business name into an Internet address.

Listing on any Host Website is open and non-exclusionary. Any legitimate entity will enjoy an unequivocal right to be listed in any or all Host Websites. For example, in a hypothetical Host Website for "Cars", Boeing Corporation could list itself there if it wanted to. Given the tens of millions of Internet participants, self-agglomeration and the permitting of multiple listings represent the only feasible and sensible approach to sorting entities on the Internet. (The alternative, that an authority would evaluate every site on the Web in order to characterize each one according to multiple parameters, is obviously unworkable, and unlikely to lead to any more accurate or equitable results.)

A Host Website listing can be amended online by the listing party without other human intervention, with immediate effect. For example, if a retail shop changes its email address, the new one can be immediately entered. In contrast, if a portal is carrying incorrect information (e.g., a link to a defunct web address), it is necessary to write to the portal and wait for a human to make the correction.

Host Website listings are multi-parameter digitally labelled with unambiguous information that is computer-manipulable. This greatly benefits the subscriber by accurately identifying it when appropriate in searches.

Host Website sites are designed to assist both publishers and users. Publishers are those who seek to provide, through the Internet, a more or less permanent and continuing source of information about themselves. One important feature of Host Websites is that they are open and non-exclusionary on both the user side and the publisher side. Other kinds of websites which are, in a loose sense, open and non-exclusionary are auction, discussion, game, deal-broking, and similar sites. However, in all such sites the participants are users, not publishers. Their participation is transactional in nature, and cannot be characterized as a "permanent and continuing source of information" in the same sense as by website publishers.

This is not merely splitting hairs. The universe of Internet participants whose primary concern is publishing includes all juridical entities or businesses with websites, all educational institutions, and all government instrumentalities—in other words, the Internet's paying constituents. On the one hand, the Internet offers passably-good mechanisms, in the form of auction and discussion sites, for individuals to trade baseball cards or express their views on Britney Spears. In contrast, the Internet has no good mechanisms for publishers, whose domain-name fees provide most of the money for maintaining the Internet itself, to systematically reach or be found by their intended Internet audiences. Host Websites offer such a mechanism.

The process of subscribing to a Host Website is designed for layman-friendly operation, requiring no computer literacy (other than the ability to get on the Internet and type), and offering fail-safe paths and prompts to ensure that a listing is correctly entered.

The listing function on a Host Website has low-level artificial intelligence in that it adapts its line of questioning depending on the previous answers, avoiding asking redundant or inapplicable questions. Only 5-10 minutes' time is required online to create a basic listing on a Host Website, making this by a wide margin the fastest and most hassle-free way to establish a presence on the Internet.

Thus, Host Websites provide a ready means by which any entity can find a suitable niche for itself on the Internet, especially benefitting individuals or small businesses with limited resources. This benefit is not attainable without the subject-specific nature of a Host Website; for example, the hypothetical cookie vendor would have great difficulty finding a suitable business category in a conventional portal. If it found one, it would later discover that few people visit the portal with the intent of looking for cookies.

Across the board and without exception, existing Business-to-Business websites suffer from two flaws, one mechanical and the other conceptual. The mechanical flaw is extreme complexity, requiring lengthy and diligent navigation, and a great deal of reading. Notwithstanding this complexity, eventually all Business-to-Business sites fall back on human judgment at the site: "Tell us about yourself, and let's talk". This flaw stems from the lack of a defined context for interactions. The conceptual flaw is the belief that all goods and services are inherently commodities, whose buyers are substantially indifferent as to who the sellers are. This is patently not the case in real life. As any genuine business-person knows, brand names, return policies, shipping times, tracking procedures, payment procedures or credit terms, physical location, and similar considerations always matter, and almost always outweigh mere price considerations.

By their nature as subject-specific sites, Host Websites can avoid the mechanical flaw of excessive complexity. And by digitally labelling entries, Host Websites can be designed to quickly and readily convey qualitative information about the sellers and buyers themselves, incorporating information of the types recited above, which will often be useful in narrowing the field of potential trading partners. Most Business-to-Business site concepts can therefore best be served by the use of the Host Website structure and related inventions.

Each Host Website can be individually designed for each subject and the potential forms of interaction predicated by the subject, while still preserving the common fundamental concepts underlying all Host Websites. There are numerous plausible subjects for Host Websites. Many of them would enable much-expanded Business-to-Business, Business-to-Consumer, and Consumer-to-Consumer applications, fore example: there can be a Host Website for Internet Vendors. The dilemma of Business-to-Consumer has been that if one starts small, it is very difficult to get noticed and stay noticed; while if one starts big, one is forced to develop complicated procurement, inventory, order-taking, and delivery systems instantly, a death-defying process which rarely ends well. Thus, Host Website would perform a useful economic and social function by sustaining visibility for small and medium vendors, allowing them to develop at a rational pace (or indeed to stay small yet prosperous); a Host Website for each country; a Host Website for each city or metropolitan area in the world with a million or more inhabitants; a Host Website for Visual Arts, which would link artists, galleries, and re-sellers with buyers around the world; a Host Website for Education, covering universities, colleges, preparatory schools, high schools, language schools, music schools and tutoring; manufacturers of any types of equipment which schools need; textbook publishers and authors; a Host Website for Books which includes authors, books and periodicals, libraries, bookstores, book auctioneers, book clubs (sellers), book societies and discussion groups, book publishers, and book reviewers; a Host Website for Newspapers, Magazines, and Periodicals around the globe; a Host Website for Science and Technology which includes journals and publications of all kinds, associations, research groups, foundations, universities, museums, online demonstrations and displays; a Host Website for Movies, Music, and Entertainment which includes people, companies, books, periodicals, software like CDs and tapes, vendors of memorabilia and other non-software products, catalogues of reviews, fan clubs, talent agents, acting and singing instruction, and musical instruction; a Host Website for Sports which includes people, companies, teams, tickets to events, manufacturers and retailers of equipment and clothing, sports-related collectibles, books and magazines, videos, vendors of accessories and gadgets for sports fans, and sports arenas and stadiums; a Host Website for Golf, which includes golf courses and clubs, equipment and clothing, instruction, training devices, gadgets and gifts, books and magazines, tickets to golf events, course designers and builders, hotels of special appeal to golfers, and golfing holidays; a Host Website for Foods and Wines which includes purveyors of fine or international foods; small businesses selling a few specialized items; makers of food-processing or cooking equipment (industrial, commercial, and home); food and wine gadgets; providers of food raw materials, ingredients, and additives; a Host Website for Children, with a global orientation and covering toys, books, clothes, education, special education, medical services, and assorted products for expectant mothers to toddlers to 18-year olds; a Host Website for Luxury Lifestyles, covering luxury goods and services plus specialty legal, financial, and accounting services; second-hand luxury items; leasing; hotels and restaurants for the well-to-do: and real estate; a Host Website for Persons, whose function would be to allow persons of all nationalities to reach and interact with each other over the Internet, where the use of multi-parameter digital labelling to identify personal characteristics and preferences can greatly assist the process of choosing persons to correspond with; a Host Website for Information, Discussion, Entertainment, and Advice, which would cover all websites which are primarily constituted to offer any of these over the Web, including portals and list sites, discussion forums, online games, advice and "expert" sites, and comparison shopping sites; a Host Website for Online Intermediation, which would cover all websites which are primarily constituted to introduce or provide a forum for buyers and sellers, such as auction sites and business-introduction sites; Host Websites (one each) for different professional categories on a worldwide basis, such as doctors, lawyers, etc., which includes publications, universities offering related degrees; practitioners, associations, and companies or sources which provide information, products, or services to the profession; Host Websites (one each) for different industries or types of businesses on a global, regional, or country basis. Examples of these are Hotels and Resorts, Cars and Accessories, Boats and Yachts, Computer Software and Hardware, Home and Building Products, and Garments.

A logical extension to Host Websites is the "Host Website Central" or "Star-Portal". The purpose of a Star-Portal would be to combine a wide range of Host Websites with different audiences and subject matters, all under one convenient Internet address. With a multiplicity of Host Websites, the public might soon lose track of Host Website addresses, or otherwise have difficulty identifying the particular Host Website they need. The Star-Portal would link to a plurality of Host Websites, avoiding this problem. Additionally, Star-Portals could offer "one-stop" listing procedures for entities which wished to list themselves on two or more different Host Websites.

In a further elaboration of the usefulness of multi-parameter digital labelling, provision could also be made for individuals to get listed on a Host Website, and have themselves digitally labelled. Such personal digital labels could convey a variety of information, but one immediate application is in respect to spam and email solicitations in general.

Most observers decry the practice of spamming, the sending of unsolicited emails on a scattergun basis to large numbers of email addresses. But in fact many persons are open to receiving unsolicited emails in general, or at least email offers which relate to a subject in which they are interested. A problem only arises when large volumes of unwanted spam flood an individual's email inbox.

Multi-parameter digital labels offer a solution, as shown in the following methodology:

1. Visitors to a Host Website (whether as individuals or representatives of a company) would be offered the option to list themselves online.

2. A question-and-answer sequence, similar to that for a website, would ensue, with a view to gathering basic demographic data and determining which subjects the visitors would be willing to receive notices about.

3. In a non-specific context, creating a list of positive preferences for spam would be daunting for both the programmer and the responder. However, Host Websites provide an ideal means of getting around this problem, by defining a limited subject. For example, in a hypothetical Host Website for Books, an individual could ask to receive notices about: new books in tightly-specified subjects, e.g., Egyptian archaeology; new bookstores opening in their city or on the Internet; book launchings and author appearances; book society events in their city; and so forth.

4. Having made their preferences known, listed persons could also amend these preferences online, in similar fashion as for websites.

5. The Host Website would make the use of its I-Want-Mail listings available to the trade, or those otherwise involved in the subject. To continue with the Books Host Website example, publishers with new books could request the Host Website to send notices to the people who said they would be interested in this subject; while public-relations consultants could do the same in respect of book-launchings.

I-Want-Mail labels, in contrast, are a means of organizing email solicitation on the Internet for the benefit of both the recipients (who can select what subjects they really want), and the senders (who can send their solicitations to self-identified parties with some assurance of commercial success, while avoiding bothering the general public). The widespread use of I-Want-Mail labelling would provide genuine benefits to the large majority of Internet participants by channelling information, of a specified nature, to those interested in receiving it.

Figure 7:
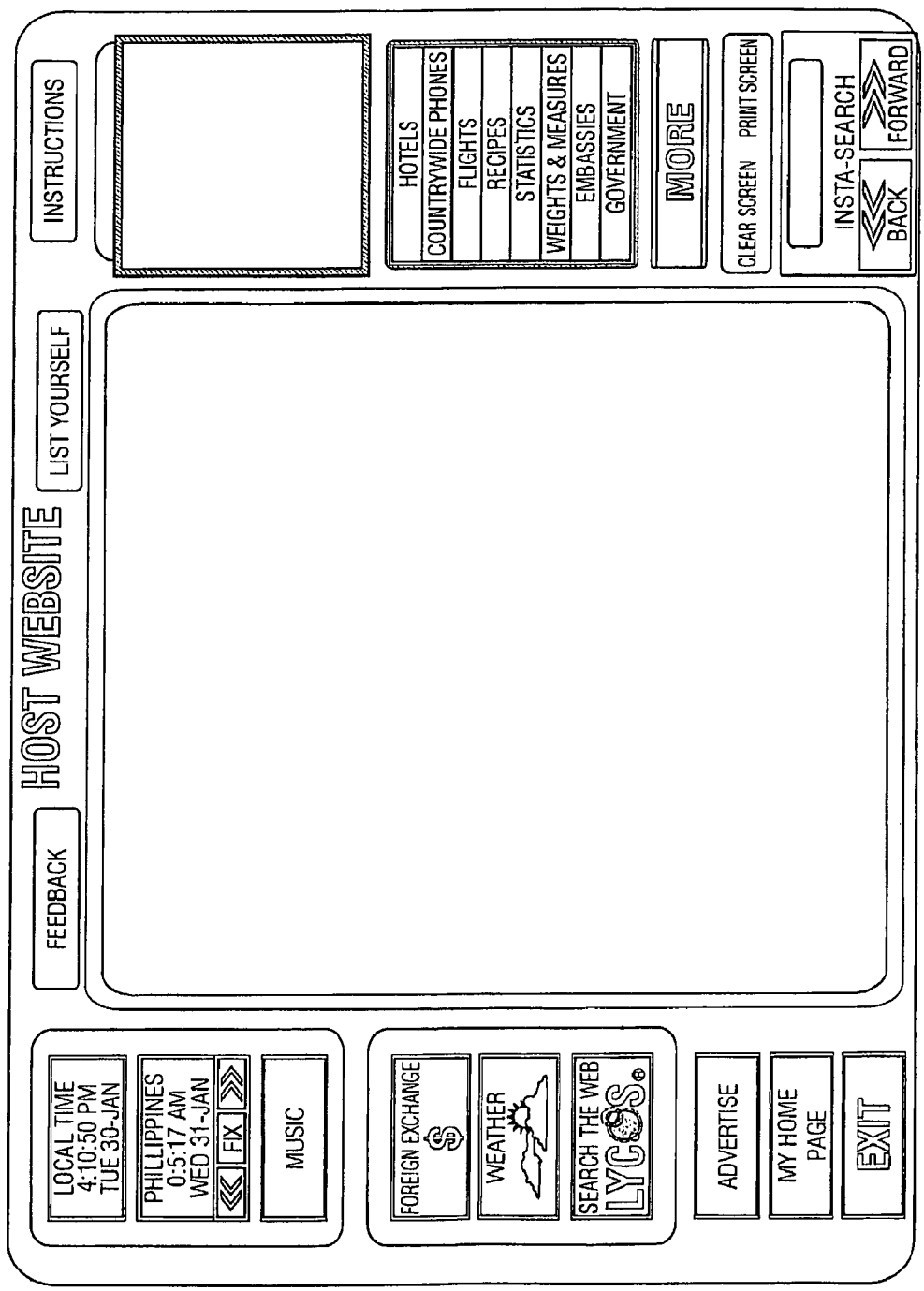
FIG. 7 shows an ergonomic webpage.

A special ergonomic graphic interface has been designed for Host Websites and Star-Portals, consisting of a fixed, non-scrolling, and essentially unchanging "main frame" which entirely surrounds a simulated video screen or screens, which are the only parts of the monitor display which actually change as a user navigates around the Host Website. An example is shown in FIG. 7 with a main-frame 101 which entirely surrounds a screen or screens 102.

With most websites, each time another page within the site is accessed, the entire physical-monitor screen display (except the browser toolbars) is "washed away" and replaced with new images and text. (That the new page may re-create some images from the previous page, e.g., a website logo or toolbar does not change the fact that the screen was in effect cleared and then re-drawn.)

The simulated-console display has the following advantages:

1. Toolbars, such as toolbars 103, and repeating graphics do not have to be re-drawn by the computer each time a new page is accessed. This speeds up the loading of new pages.

2. Simulated-console displays allow a more logical placement of commands 104 and buttons 106 with different functions for expected frequencies of use, making site navigation more intuitive and less reading-intensive than the single-toolbar approach used by a few sites. This kind of display could thus be described as "ergonomic".

3. The permanent location of the simulated screens 102 within the console provides a visual cue which reduces the visual and mental strain needed to understand a display or to find information on the displays. For example, a main screen could display the content asked for in a search, while a smaller guide screen could offer advice to the user on what to do next. Knowing that the smaller screen usually displays "advice", a user (after a little practice) will instinctively turn his or her eye to that screen when help is needed.

4. By representing a physical object, the simulated-console display seems more inviting and provides an ersatz "tactile" dimension which will be appreciated by most if not all users. Many users with a "right-brain" orientation will find the simulated-console display easier to use than conventional website interfaces, thus facilitating Internet participation by a large segment of the public.

5. Providing a constant main-frame 101 eliminates the risk that a user will get lost within a site or have difficulty navigating it. The current art of providing site "maps" is perhaps useful to the mechanically-inclined, but does little to guide the average non-mechanical lay-person.

6. Finally, the use of screens-within-the-real-screen permits the orderly presentation of online advertising when a given screen is idle, without cluttering the overall look of a page and without confusing the user as to which items are part of the website and which are transient advertising.

In summary, the Host Website's graphic interface, a simulated-console display, offers many advantages over other webpage designs. While this kind of interface will not be appropriate for all publishers, it is particularly well-suited to websites which need to display a large variety of different kinds of information in an orderly and appealing manner. Examples of such websites are: portals, list sites, newspapers and magazines, online catalogues, and online vendors in general.

Alternate Embodiments

Insufficiency or lack of clarity of information makes markets inefficient. For example if two used cars of equal make, year, and condition are for sale, but a potential buyer is aware of only one of them, the buyer may end up paying a higher price than necessary. A related problem is that decisions based on insufficient or wrong information may be ineffective or costly, and if widespread can be costly to society as a whole. For example, if many car purchasers were unaware of the availability of a particular safety feature or safe-driving practice, then in aggregate there may be more accidents than might otherwise have been the case, entailing greatly more social costs than the safety feature or safe-driving practice would have.

A practical example of these problems is health care insurance. Insurance companies do not have reliable statistics on the general health of the population, or on the long-term costs of health care associated with certain medical conditions. As a result, health insurance premiums may be higher than they need to be.

From the viewpoint of individuals desiring insurance, finding and comparing types of coverage is tedious and complicated, health care information is not systematically available to the average layman, and personal health in aggregate may suffer. In contrast, by being personally aware of the latest developments in medications, medical devices, correlations between diseases and lifestyle, ethnicity, age, and residence (among others), individuals could make better-informed choices about their health.

Current methods of maintaining medical records are often merely on paper; or if on a computer, are in mere text form which cannot be searched accurately. And in all events these records are "local" and idiosyncratic to a doctor, a hospital or at most a hospital system: were a person to move to a new town, the old medical record would have to be reconstructed, or might just be ignored. And there is no way to provide a "big picture" of the healthiness of people in a country without making risky extrapolations.

A preferred embodiment addresses the need for a national information system which is easy to access, a Health Database Website open for all persons and entities connected to health and health care. Each person (probably aided by a specially-trained health-care professional, possibly in the context of personal health insurance) could open a personal health record and provide data which in effect labels him or her medically and health-wise, thus becoming an "Individual Health Database Subscriber" (or "Individual Subscriber"). After a record has been created, it would be added to over time by different parties. This would constitute a continuing record of personal health, diagnoses of disease, prescriptions, accidents, test scores, and so forth, that is permanent and accessible (by authorized parties) anywhere in the country or the world.

An entity which provides products or services related to health could also subscribe to be on the database, using digital labels to identify its particular qualities, thus becoming a "Health Provider Subscriber". A hospital, for example, could digitally label its specialties, its geographic location, its diagnostic facilities, and other qualities; Individual Health Database Subscribers could search for an appropriate hospital when needed. A pharmaceutical and supplement companies could digitally label the medical conditions for which they offer remedies, so that an Individual who searched for "arthritis remedies" could obtain a list of different products (not necessarily just prescription medicines) which are claimed to treat arthritis. A doctor could label his or her medical degree, specialization, and specific skills, as well as his or her geographic location and hours or days available to receive patients, so that Individual Subscribers with certain ailments, or their family practitioners, could easily search for a doctor when needed.

Insurance companies would be "Insurance Providers" in the database. They could provide digitally-labelled information about their various coverage plans, their geographic reach, and the price ranges. They could also research the database but in addition would have the possibility of sending communications (such as offers of coverage, or advice on lifestyle choices) to individual persons listed, based on the health profiles, ailments, etc., of those individual persons. This would probably lead to a larger-variety of coverage plans, which meet the needs of more people, more closely.

Moreover, insurance companies would be able to compete for a person's business through an online intermediation process. If several insurance companies periodically made such offers to many or all of the persons health-labelled on the database, then each person would be somewhat assured of being able to select the best deal for his or her needs.

Websites which provide health-related information would be "Health Information Providers" in the database. They would have no authorization to scan the database or view records, but Individual Subscribers could search for information on specific health subjects and be guided to the various Health Information Providers which have subscribed on the database and which have something to say about the subject searched for.

There would also be a benefit in actual health. Pharmaceutical companies, medical-device manufacturers, and even food supplement providers with pertinent products could quickly and cost-effectively bring these to the attention of a large number of potential customers of a specified health profile, e.g., diabetics, people with asthma, people under end-of-life care, etc. Because people or at least their physicians would be more aware of their treatment options and be able to readily compare costs, they would experience better health care and be more satisfied with the general health-care system. An interface would be provided to allow Health Provider Subscribers to initiate research in these fields.

Hospitals or clinics could periodically take note of personal medical histories of persons residing in their service area, and by cross-reference to age, ailment, and other factors, could remind specific persons when a checkup or other procedure is desirable. An ounce of prevention being worth a pound of cure, this would save costs for all concerned in the long run.

Notices and advertisements could be sent to people in a benevolent kind of spam. In regard to demographic or medical characteristics that they have, Health Database Subscribers would be able to elect how often they are willing to receive email (e.g., monthly, quarterly, never), and would be able to report senders who send irrelevant or misleading solicitations.

Hospitals, physicians, pharmaceuticals, and others could also search the personal-health database with a view to discovering what ailments are on the rise or on the decline in the general population of the country, or in the general population of a given geographic area, what treatments seem to reduce long-term costs or quicker recovery from ailments, and similar matters, and this would guide them in research and product development and design, personal specialization, choice of hardware to invest in, and other aspects of their business or profession.

Asymmetric Access. Unlike most search engines or Host Websites with digital labels, whose labels are open for use by the general public on a symmetric basis, the subscribers to a Health Database Website would be differently qualified, for example:

An Individual Subscriber could view his or her personal record by providing an appropriate password or correctly answering questions about the record, but not the records of other individuals. An Individual Subscriber could also freely search the database for Health Provider Subscribers of different types. An Individual Subscriber could also freely search the database, with his or her personal records as a starting point, for Insurance Providers who offer coverage for which this Individual Subscriber would be eligible.

A dentist could view the dental records of an Individual Subscriber in his or her care, but not the non-relevant parts of an Individual Subscriber's medical history, or records of other individuals.

A physician would be authorized to view the entirety of an Individual Subscriber's records if in his or her care, but not the records of other individuals unless they explicitly agree.

A pharmaceutical company; a maker or distributor of medical, exercise, therapeutic, or diagnostic devices; a purveyor of health supplements and herbs; and similar types of subscriber would be authorized to scan the database for the purpose of extracting statistics, but would not be authorized to view any Individual Subscriber record. This kind of party would also be authorized to search for a list of Individuals with a configuration of specified characteristics as revealed by their labels; and would have the option to send email or other communications to the Individuals found, but this would be done through the intermediation of the Health Database Website so that the actual names would not be known to the sender of the communication.

An insurance company would be authorized to scan the database for statistics, and would have the option to send email or other communications to the Individuals found, but this would be done through the intermediation of the Health Database Website so that the actual names would not be known to the insurance company.

A hospital, clinic, or treatment facility would be authorized to search the database for lists of Individuals with a configuration of specified characteristics (for example, geographic proximity for patients with a given condition) as revealed by their labels; and would have the option to send email or other communications to the Individuals found, but this would be done through the intermediation of the Health Database Website so that the actual names would not be known to the sender of the communication.

An emergency-response unit would be authorized to view relevant parts of an Individual's record, such as blood type, currently-applicable medical conditions, medical prostheses, and allergies, but not irrelevant other parts, such as past pregnancies or diagnoses of STDs.

As a further check against misuse, each access event would be logged.

Advantages for Individual Subscribers. The individuals who maintain their health records in the Health Database Website would benefit in several direct and indirect ways:

If a person falls ill while traveling, or if he or she requires emergency services, all the relevant personal medical history could quickly be accessed by authorized personnel.

When a person moved to a new town or tried a different physician or hospital, or changed insurer, he or she would not need to fill out lengthy questionnaires or undergo unnecessary repeat tests; the new physician or hospital would only need to look up that person's record through the Internet.

When a person applied for health insurance or life insurance, the potential insurers would be looking at the same health picture, so their quotes would be comparable and competitive. The Health Database Website could be configured to automatically evaluate a person based on his or her history recorded on the database, and to periodically or upon request offer a list of health care policies for which the person is qualified. This would lower insurance costs for the insured parties, while reducing overhead and costs of marketing for the providers of products or services.

A continuing record of diagnoses, blood tests, ECGs, prescriptions, and the like would assist physicians in making accurate evaluations and useful recommendations for each individual. This would improve actual health of Health Database Subscribers. This would lower actual health-care costs, which would benefit insurers and eventually lead to lower premiums.

As a medium for searching for and receiving information and advertisements related to health care, the Health Database Website would help make people better-informed, which would improve their actual health over time by apprising them of new scientific findings, medications and devices, and procedures. This would not only lower long-run costs but also improve the quality of life of the Health Database Subscribers.

With a single authorization, a Health Database Subscriber could authorize several parties to view or share his or her individual health records, according to specified rules.

By indicating that he or she is open to participating in clinical trials, a person could signal to pharmaceutical companies or research laboratories this willingness, thus possibly being eligible to participate in trials without having to scour newspapers and magazines for advertisements of upcoming trials.

Advantages for Health Provider and Insurance Subscribers: They would be able to obtain statistics of various kinds, on a nationwide level. This would guide them in research, business decisions, pricing, and other decisions.

They would be able to advertise, to bring their products and services to the attention of a high-relevance audience in a cost-effective way, rather than (for example) having to advertise on national TV. The intermediation of the Host Website or search engine would allow this to be done without the advertiser knowing the specific addressees.

They would easily be found in a relevant search by Individual Subscribers looking for certain services or products, or according to whatever combination of characteristics (e.g., a cardiologist with more than 20 years' experience, a life insurance company operating in Georgia with at least a BBB credit rating).

Advantages for Society: Better health for the general population, with a reduction in the social and economic costs caused by disease and poor health.

Variations, offshoots, and modifications of the system are possible, as would be apparent to a person having ordinary skill in the art. For example, the system can be used in relation to apparel, leisure goods, consumer goods, entertainment, and other fields. By knowing the weight, height, waistline, and age of a large number of people, an apparel manufacturer or retail chain could design clothes to better fit more people.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description but by the claims following.

I claim:

1. A system for digital labeling of websites, comprising:
    means for encoding personal preference digital labels wherein the said digital labels denote the nature of the content of a website, and are encoded within or on the same computer system as the website or internet posting, by a creator of the website or internet posting;
    wherein the encoding conforms to a convention that is promulgated by an internet search engine or internet browser program or service;
    means for at least one of scanning, reading and recording the labels referent to a website by the internet search engine or internet browser program;
    means for at least one of including and excluding a website or internet posting from search results; and
    means for at least one of allowing and disallowing that website or internet posting to be accessed or to be displayed on the monitor.

2. The system of claim 1, further comprising means for accessing a host website and answering queries for creating digital labels.

3. The system of claim 1, further comprising means for identifying through the digital labels, the presence of at least one of sexual content, images, video files, audio files, and text, on a website or internet posting.

4. The system of claim 1 further comprising means for revealing through a digital label, at least one of a political, religious, military, social, sexual, or philosophical orientation that is espoused or discussed or in any way presented in, a website or internet posting.

5. The system of claim 1 further comprising means for revealing through a digital label, the presence or absence of any kind of information, image, audio file, video file, or any other data.

6. The system of claim 1, further comprising means for revealing through a digital label at least one of a geographic origin of a website or internet posting, a national origin of a website or internet posting, the national origin of a creator of a website or internet posting, and the geographic origin of a creator of a website or internet posting.

7. A method for digital labeling of websites, comprising:
    encoding personal preference digital labels wherein the said digital labels denote the nature of the content of a website, and are encoded within or on the same computer system as the website or internet posting;
    conforming the encoding to a convention promulgated by an internet search engine or internet browser program or service;
    at least one of scanning, reading and recording the labels referent to a website by the internet search engine or internet browser program;
    at least one of including and excluding a website or internet posting from search results; and
    at least one of allowing and disallowing that website or internet posting to be accessed or to be displayed.

* * * * *